United States Patent [19]
Rose

[11] Patent Number: 5,454,588
[45] Date of Patent: Oct. 3, 1995

[54] INFLATABLE CUSHION ASSEMBLY

[75] Inventor: Larry D. Rose, Layton, Utah

[73] Assignee: Morton International, Inc., Chicago, Ill.

[21] Appl. No.: 289,868

[22] Filed: Aug. 12, 1994

[51] Int. Cl.$^6$ .................................................. B60R 21/16
[52] U.S. Cl. .................. 280/728.2; 280/732; 280/743.1
[58] Field of Search ............................ 280/728.2, 743.1, 280/732

[56]            References Cited

U.S. PATENT DOCUMENTS

| | | | |
|---|---|---|---|
| 3,414,292 | 12/1968 | Oldberg et al. | 280/740 |
| 3,514,125 | 5/1970 | Nemecek | 280/728.2 |
| 3,810,654 | 5/1974 | DeBano, Jr. et al. | 280/728.1 |
| 4,111,457 | 9/1978 | Kob et al. | 280/728.2 |
| 4,286,954 | 9/1981 | McArthur et al. | 493/244 |
| 4,332,398 | 6/1982 | Smith | 280/732 |
| 4,817,828 | 4/1989 | Goetz | 222/3 |
| 4,877,264 | 10/1989 | Cuevas | 280/731 |
| 4,941,678 | 7/1990 | Lauritzen et al. | 280/732 |
| 4,986,569 | 1/1991 | Bruton | 280/728.3 |
| 4,988,119 | 1/1991 | Hartmeyer | 280/728.2 |
| 5,058,919 | 10/1991 | Paquette et al. | 280/732 |
| 5,069,480 | 12/1991 | Good | 280/743.1 |
| 5,186,492 | 2/1993 | Wright et al. | 280/728.2 |
| 5,195,775 | 3/1993 | Komerska et al. | 280/732 |
| 5,263,739 | 11/1993 | Webber et al. | 280/728.2 |
| 5,277,442 | 1/1994 | Cuevas | 280/731 |

FOREIGN PATENT DOCUMENTS 1160756   6/1989   Japan .

*Primary Examiner*—Kenneth R. Rice
*Attorney, Agent, or Firm*—Taylor J. Ross; Gerald K. White

[57]            ABSTRACT

The present invention provides an improved inflatable cushion assembly and method for coupling an inflatable cushion (12) to a reaction housing (16) in an inflatable restraint system. The assembly utilizes various arrangements of a flanged strip inserted into a channel member (36) disposed about the gas inlet opening (30) of the cushion (12) to form a flanged cushion insert (7,8). The flanges of the cushion insert retain the strip (42) in the channel member (36), and are used in the assembly process to couple the flanged cushion insert, in a fastenerless manner, either to a cushion retainer member (14), which in turn is coupled with the reaction housing (16), or directly to the reaction housing (16).

57 Claims, 4 Drawing Sheets

1

INFLATABLE CUSHION ASSEMBLY

BACKGROUND OF THE INVENTION

1. Field of the Invention

The present invention relates to an inflatable cushion assembly for use in an inflatable restraint system, and in particular to an assembly, system and method for coupling an inflatable cushion to a reaction housing in an inflatable restraint system.

2. The Related Art

Inflator restraint systems generally include an inflatable cushion (commonly referred to as an air bag), an "inflator" for providing gas to inflate and deploy the cushion upon sudden deceleration of a vehicle employing the restraint system, and a reaction housing or canister for supporting and/or containing the air bag and inflator. In such systems, commonly referred to as an air bag module, the cushion typically has an open section that defines a gas inlet opening for receiving the gas upon activation of the inflator. Because of the great amount of force exerted on the cushion and reaction housing during the initial stage of inflator activation, the coupling and securement of the cushion to the canister becomes important, if not crucial, for proper functioning of the cushion during its deployment. In assembling the module, it is important to couple the cushion with the reaction housing in a manner that is simple and economical, and yet which will provide a secure and reliable attachment.

One such system for attaching an inflatable cushion to a reaction housing is disclosed in copending application Ser. No. 07/993,280, filed Dec. 18, 1992 by Lauritzen et al., now allowed, U.S. Pat. No. 5,344,182 issued Sep. 6, 1994 which is assigned to the assignee of the present invention and is incorporated herein by reference in its entirety. The system employs a metal cushion retainer which includes a pair of cylindrical channel portions that are separated by spacers (FIG. 4) into which a corresponding pair of thickened peripheral gas inlet openings of an inflatable cushion is inserted (see FIG. 3). The thickened gas inlet opening is typically formed by hemming the gas inlet opening of the cushion to form a channel into which a bead material, such as a plastic rod, is inserted. Once formed, the thickened gas inlet opening is inserted into the respective channel portion of the cushion retainer to define an attachment insert (FIG. 4) which in turn is incorporated into an attachment sleeve of a reaction housing for the fastenerless attachment of the inflatable cushion thereto.

While the use of a plastic rod in the hem of the gas inlet opening of the cushion facilitates the equal distribution of stresses on the cushion during its deployment, as well as to assist in the avoidance of point loading of those stresses, the bead material or rod will have a tendency to fall out of its channel or hem both during the handling of the cushion and during its assembly into the inflatable restraint system. Moreover, if the stresses imposed on the cushion during its deployment are in excess of operating standards, the bead material or plastic rod will have a tendency to pop out of its respective containment if it is not properly seated or retained in the cushion retainer, thereby causing a failure of the attachment arrangement for joining the cushion to the reaction housing. Additionally, the material of the thickened gas inlet opening is subjected to rupture or tearing when it is being assembled to the metal cushion retainer which causes the assembly process to be a cumbersome operation.

Systems utilizing some form of insert positioned in a channel formed at the mouth of an inflatable cushion are known in the prior art. In U.S. Pat. No. 4,817,828 issued Apr. 4, 1989 to Goetz, a metal bar is inserted into a pocket formed by overlapping the material of the airbag and sewing a hem or stitch line (FIG. 21). Both the airbag material and bar are connected with the edge of a canister by a staple inserted through the canister, airbag fabric and metal bar, thereby necessitating the additional use of human intervention for the alignment process, and also for the installation of the staple during the airbag's attachment assembly process. The same holds true with the arrangement illustrated in FIG. 2 wherein the strip, airbag material and reaction canister sidewall are crimped to form a toggle lock. In each case, the fabric of the air bag is exposed to tearing during the assembly process.

In another arrangement, a clamping means is used to connect an inflatable bag to the housing of an automotive restraining device as disclosed in U.S. Pat. No. 4,111,457 issued Sep. 5, 1978 to Kob et al. The gas inlet portion of an air bag is bent about a cord-like insert to form a bead shaped rim for its introduction into a key-shaped channel of a profiled strip (FIG. 2). The profiled strip, which is made of a rubber-elastic material, is designed for circumferential engagement with a continuous flange provided about the peripheral end of the housing. Once the profiled strip is mounted to the housing, a ring, consisting of two halves (FIG. 1), is clamped about the rim-containing strip to engage the inflatable bag with the housing flange. The assembly process for this arrangement requires a continuous cord-like material circumferentially mounted to the housing for attachment of the air bag.

A system utilizing two segments of a U-shaped mounting rod inserted into two hem loops of an air bag for securing the hem loops to an inflator housing container is disclosed in U.S. Pat. No. 5,263,739 issued Nov. 23, 1993 to Webber et al. The hem loops are retained on the common mounting rod (retainer 20) by the attachment of a plate to the ends of the two rod segments with a pair of push nuts (see FIG. 1). Unfortunately, the hem loops of the air bag must be placed into the grooves of chute flanges before the hem loops can receive the rod segments therein, thus making the air bag attachment a difficult and time-consuming process.

Other systems utilizing an insert in a channel formed at the mouth of an inflatable cushion are described in U.S. Pat. No. 3,514,125 issued May 26, 1970 to Nemecek;
U.S. Pat. No. 4,941,678 issued Jul. 17, 1990 to Lauritzen et al.;
U.S. Pat. No. 4,986,569 issued Jan. 22, 1991 to Bruton;
U.S. Pat. No. 4,988,119 issued Jan. 29, 1991 to Hartmeyer;
U.S. Pat. No. 5,069,480 issued Dec. 3, 1991 to Good;
U.S. Pat. No. 5,186,492 issued Feb. 16, 1993 to Wright et al.;
U.S. Pat. No. 5,195,775 issued Mar. 23, 1993 to Komerska et al.; and
U.S. Pat. No. 5,277,442 issued Jan. 11, 1994 to Cuevas;

Unfortunately, such arrangements typically employ fasteners, such as rivets, bolts, screws, staples and the like, to secure the cushion in one form or another to an associated member of the inflatable restraint system. Moreover, none of the systems described in the above patents addresses the need for retaining the inserts in the pocket or channel of the cushion to provide for an improved fastenerless coupling of the cushion to an associated member of the inflatable restraint system.

SUMMARY OF THE INVENTION

In order to overcome the foregoing problems, and to assist in the assembly of an inflatable cushion for use in an inflatable restraint system, the present invention provides an inflatable cushion assembly that includes an inflatable cushion comprising a gas inlet opening and a channel member disposed about the gas inlet opening, and at least one elongate strip disposed within the channel member. The channel member may be formed from any suitable material although it is preferable to have it constructed from the material of the gas inlet opening of the cushion in the form of a hem, such as, for example, by overlapping the cushion material and attaching both pieces of the material together by sewing or stitching.

The inflatable cushion assembly also includes a means for retaining the strip within the channel member that comprises at least one flange, preferably a plurality of flanges, fixedly disposed about the strip for communicating with the channel member. In one aspect of the invention, the flange is engaged with a corresponding opening provided in the channel member such that the flange is substantially exposed exteriorly thereof. The opening in the channel member generally takes the form of a slot provided in the hem of the cushion into which the flange is inserted. The configuration of the flange and channel member is such that the flange, which is fixedly disposed about the elongate strip, is slidably received within the channel member preferably with an interference fit, and once engaged with its corresponding opening in the channel member, retains the elongate strip therein.

In another aspect of the invention, the means for retaining the elongate strip within the channel member may additionally comprise a flange disposed about each end of the elongate strip such that the channel member is disposed therebetween. In order to facilitate insertion of the elongate strip within the channel member, it is preferable that the flange and strip be of a one piece construction, for example, the construction being obtained by mold injection of a suitable plastic material in the form of a flanged rod.

In yet another aspect of the invention, the means for retaining the strip within the channel member comprises an end cap having a flange mounted thereto, the resulting flanged cap being mounted to each end of the elongate strip such that the channel member containing the strip is retained between and adjacent to the flanges accompanying the caps. The elongate strip to which the flanged caps are mounted may additionally include at least one flange disposed about the strip for engagement with a corresponding opening provided in the channel member. To insure the retention of the cap on the end of the elongate strip, the opening in the cap may be such that it forms an interference fit with the end of the strip, or it may be fixed to the strip by any suitable means such as by adhesive bonding.

The channel member of the inflatable cushion, elongate strip and means for retaining the elongate strip within the channel member, when combined together, define a flanged cushion insert. The flanges engaged with the elongate strip may be of a resilient or deformable consistency to facilitate their slidable incorporation into, and retention in, a receptacle, for example, a corresponding channel or sleeve, for coupling the cushion insert, and hence the inflatable cushion, to a reaction housing in an inflatable restraint system. The term "resilient consistency," as it is applied to the flanges according to the invention, is defined as a temporary alteration in shape of the flange when it is subjected to an external force with the capability of returning to its original shape when the external force is removed. The term "deformable consistency," as it is applied to the flange herein, is defined as a substantially permanent alteration in shape of the flange when it is subjected to an external force, such as, for example, by crimping, i.e., the flange does not have the capability of returning to its original shape when the external force is removed.

The assembly according to the invention eliminates the possibility of the strip becoming separated from the cushion channel member during its transit and handling. By using flanges disposed about an elongate strip for coupling the cushion insert into its respective channel or sleeve receptacles, an easy handling and positive positioning of the cushion during the assembly process is assured. Moreover, contact of the retainer or sleeve with the material of the cushion channel member during the assembly process is substantially reduced.

Accordingly, and in keeping with another aspect of the invention, the flanged cushion insert is incorporated into an inflatable restraint system under one of two circumstances: either joined with a channel portion of a cushion retainer member, such as that described in commonly owned, copending application Ser. No. 07/993,280, to form a cushion retainer insert for coupling with a reaction housing, or joined directly with the reaction housing member itself.

In the first circumstance, the cushion assembly may further include, in addition to the flanged cushion insert described above, a cushion retainer member comprising at least one channel portion for receiving and securing the flanged cushion insert therein to form a cushion retainer insert for coupling the inflatable cushion to a reaction housing member contained within the inflatable cushion restraint system. The channel portion is generally in the form of a compressible sleeve that includes an elongate slot extending over the length of the sleeve and communicating with the interior thereof.

The cushion retainer member typically includes a plurality of channel portions, preferably two, which define first and second channel portions, for receiving and securing a corresponding number of flanged inserts therein. In the preferred embodiment, the first and second channel portions are joined together in spaced apart relationship by at least one spacer member, preferably two, in which the first and second channel portions are substantially parallel to each other. The channel portion of the cushion retainer member and flanged cushion insert, when joined, form a cushion retainer insert which is configured to be coupled with a reaction housing in an inflatable cushion restraint system.

The advantage of providing a cushion retainer member as an interface between the flanged cushion insert and the reaction housing is to minimize expansion and deformation of the reaction housing immediately after the inflator is activated. Because of the forces exerted on the reaction housing by the rapidly expanding gas generated by the inflator into the inflatable cushion, the cushion retainer serves to prevent damage to the reaction housing by reinforcing its side walls.

In the second circumstance, which forms yet another aspect of the invention, the flanged cushion insert may be coupled directly with the reaction housing member of the inflatable restraint system by incorporating the flanged cushion insert into a corresponding attachment sleeve mounted to the housing member. Accordingly, a system is provided for coupling an inflatable cushion to a reaction housing within an inflatable restraint system comprising, in addition to the cushion and flanged cushion insert described above, a reaction housing comprising an attachment sleeve configured to slidably receive the flanged cushion insert therein. The attachment sleeve is typically formed as an integral part of the reaction housing and is generally of a substantially cylindrical construction that also includes an elongate slot communicating with the interior of the sleeve and disposed along the length thereof. The reaction housing generally comprises a plurality of attachment sleeves, preferably two, for receiving a corresponding number of flanged inserts therein.

The system may further include the cushion retainer member and its various embodiments described hereinbefore, the cushion retainer member comprising at least one channel portion for receiving and securing the flanged cushion insert therein. As noted above, the channel portion and retained flanged cushion insert combine to form a cushion retainer insert which is configured for incorporation into the attachment sleeve of the reaction housing to couple and secure the inflatable cushion therein.

In accordance with a further aspect of the invention, a method is provided for fabricating an inflatable cushion assembly for incorporation into an inflatable restraint system comprising the steps of a) providing an inflatable cushion which includes a gas inlet opening and a channel member disposed about the gas inlet opening; b) inserting an elongate strip within the channel member of the cushion; and c) retaining the strip within the channel member by providing a retaining means comprising at least one flange fixedly disposed about the strip for communicating with the channel member. The flange is preferably engaged with a corresponding opening provided in the channel member such that the flange is substantially exposed exteriorly thereof, the flange being configured to be slidably received in the channel of the channel member. The channel member of the inflatable cushion, elongate strip and retaining means, when combined together, define a flanged cushion insert. Other embodiments of the method include the various means for retaining the elongate strip within the channel member of the cushion as described above.

The invention also provides a method for coupling the inflatable cushion to a reaction housing in an inflatable restraint system comprising the step of inserting the foregoing flanged cushion insert into an attachment sleeve that is fixedly engaged with the reaction housing and configured to slidably receive the flange of the cushion insert therein. In a preferred embodiment, the flange of the cushion insert is of a resilient consistency to facilitate its axial insertion into the attachment sleeve and its securement therein.

Alternatively, the method may include the placement of the flange of the cushion insert, which is preferably of a deformable consistency, into the channel portion of the retainer member to form a cushion retainer insert, and then incorporating the retainer insert into a corresponding attachment sleeve of the reaction housing. Securement of the flanged cushion insert within the retainer member may be obtained by compressing the respective channel portion about the insert.

By the use of a flanged cushion insert as described above, contact of the retainer member or attachment sleeve with the material of the channel member of the cushion during the assembly process is kept to a minimum. In addition, by retaining the elongate strip in the channel member of the inflatable cushion in the manner described above, a positive positioning of the gas inlet opening of the cushion into the respective cushion retainer or attachment sleeve is achieved for aligning and securing the cushion with the reaction housing.

BRIEF DESCRIPTION OF THE DRAWINGS

A complete understanding of the present invention may be obtained by reference to the following detailed description, and the accompanying drawings which form a part of the specification and in which preferred embodiments of the invention are illustrated. Thus.

DETAILED DESCRIPTION OF THE INVENTION AND PREFERRED EMBODIMENTS

The present invention provides an improved inflatable cushion assembly for coupling an inflatable cushion (hereinafter referred to as a "cushion") within an inflatable restraint system that is normally utilized in automotive vehicles, although it is to be understood that its use may be adopted for other types of vehicles such as airplanes. More particularly, the invention provides an assembly in the form of a flanged cushion insert for coupling the cushion to a reaction housing which, in addition to the cushion and inflator, forms part of the restraint system.

Figure 1:
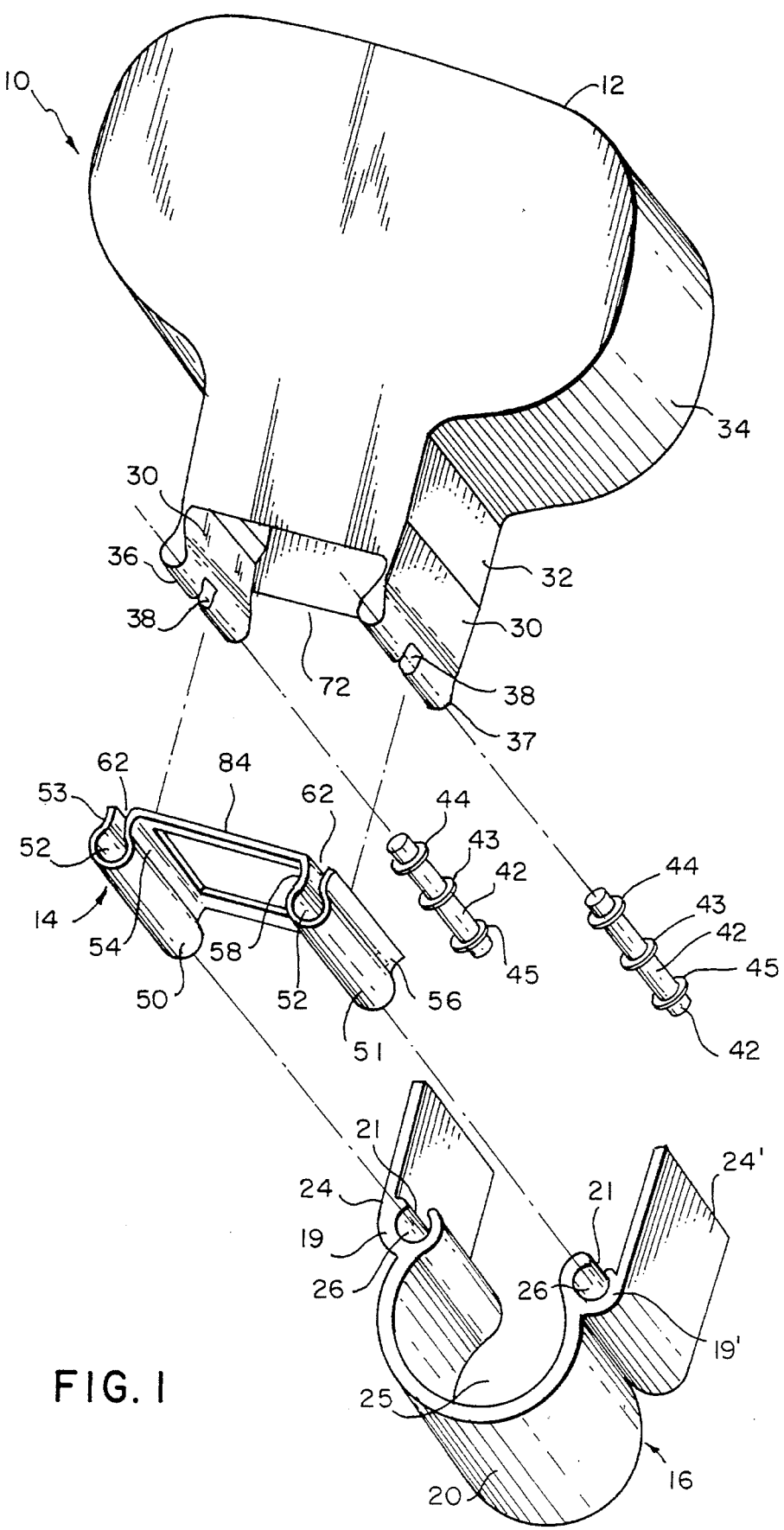
FIG. 1 is an exploded perspective view illustrating a system for coupling an inflatable cushion to a reaction housing according to one embodiment of the invention.

Referring to FIG. 1, an exploded perspective view of a system 10 for coupling an inflatable cushion to a reaction housing in an inflatable restraint system is illustrated, which includes a cushion 12 in an inflated condition, a cushion retainer member 14, and a reaction housing 16. The cushion is comprised of three sections which include a gas inlet opening 30, a throat section 32, and a pillow section 34. The gas inlet opening 30 defines that area of the cushion, as the name implies, for admitting gas from an inflator (not shown) through an opening 72 into the throat section 30, followed by its entry into pillow section 34 which serves to cushion and protect a person from serious injury during sudden deceleration of the vehicle, for example, during a collision. The inflator does not form a part of the invention herein, and will therefore not be further described.

Figure 2:
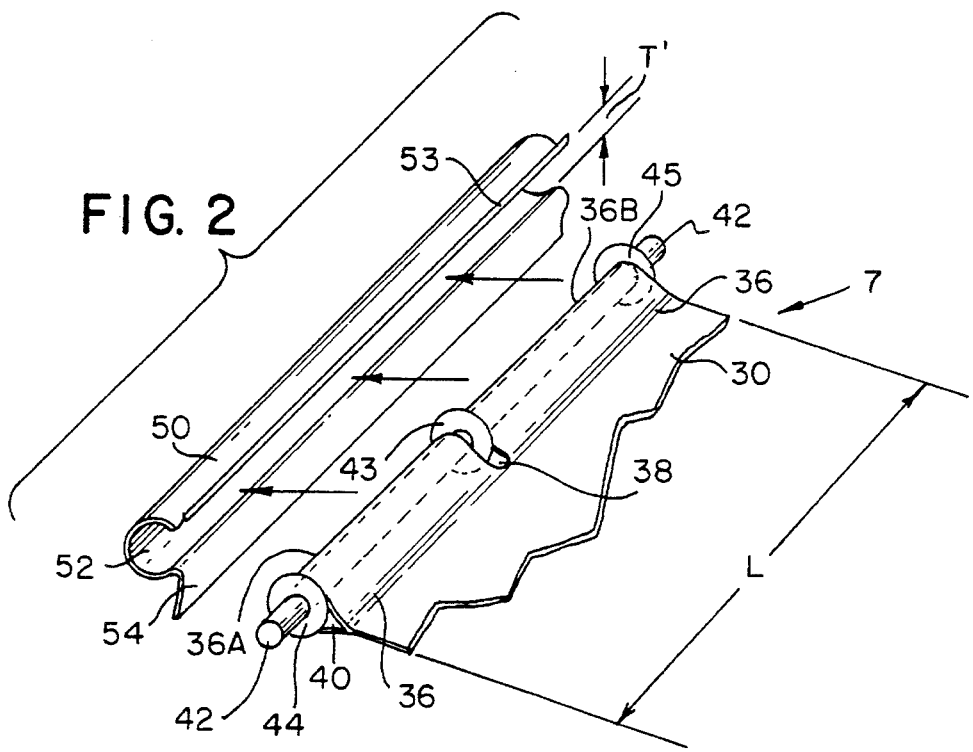
FIG. 2 is an exploded fragmentary perspective view of a flanged cushion insert illustrating the manner of its introduction into the channel portion of the cushion retainer member shown in FIG. 1.
Figure 3:
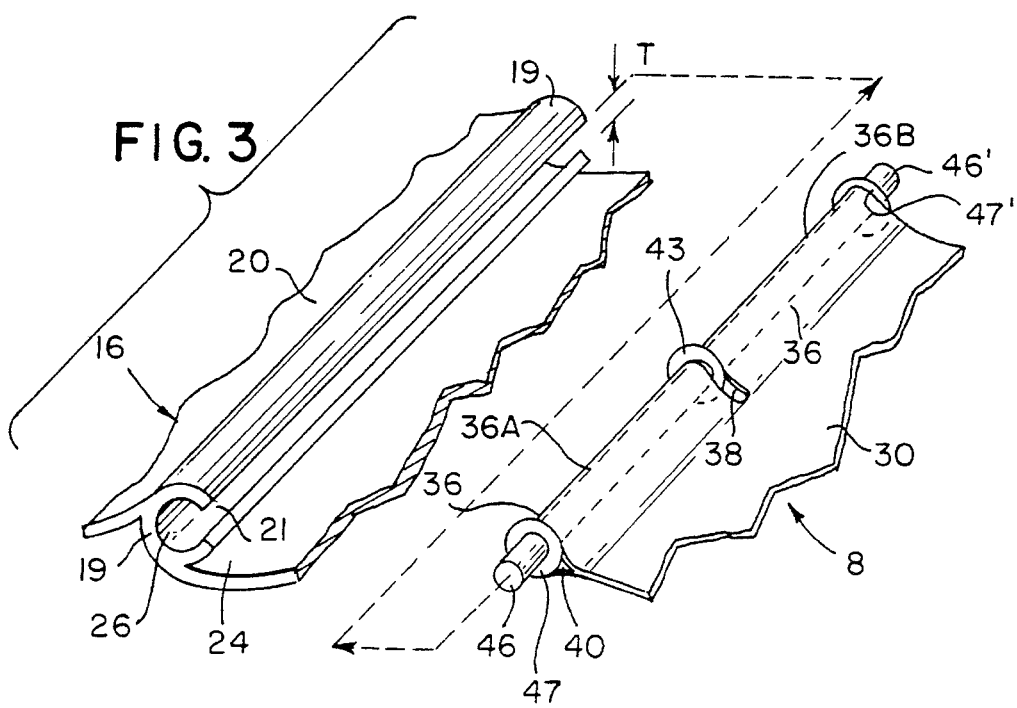
FIG. 3 is an exploded fragmentary perspective view of a flanged cushion insert illustrating the manner of its introduction into the attachment sleeve of the reaction housing shown in FIG. 1.

Referring to FIGS. 2 and 3, an inflatable cushion assembly is illustrated in which gas inlet opening 30 of cushion 12 is provided with a channel member 36 in the form of a hem at opening 72. A channel 40 is formed in the hem by overlapping the cushion material and attaching both pieces of the material that is formed by sewing a stitch (not shown). While channel member 36 is integrally formed with the gas inlet opening of cushion 12, it is possible to separately fabricate the channel member from any suitable material and attach it to the cushion by conventional means, for example, by sewing. As illustrated in FIG. 1, a pair of channel members 36 and 37 are provided at the gas inlet opening 30 of cushion 12 such that each channel member is spaced apart from one another in substantially parallel relationship.

Referring specifically to FIG. 2, channel member 36 envelops a rod 42 having a central flange 43 and end flanges 44 and 45. End flanges 44 and 45 are secured proximate to the end of rod 42. Rod 42 and flanges 43, 44 and 45 are mold injected into a one piece construction from a suitable plastic material, although the rod and flanges can take any shape in the form of a strip. The rod and flanges can be fabricated from any suitable material such as plastic or metal stock, and fixed to each other by conventional means. Rod 42 extends slightly beyond the confines of channel member 36 and is retained in channel 40 by the admittance of central flange 43 into a slotted opening 38 provided in the material of the channel member. The introduction of central flange 43 into opening 38 divides the channel member into two sections, 36A and 36B. End flanges 44 and 45 are spaced apart from center flange 43 so as to dispose and contain channel member section 36A between flanges 43 and 44, and channel member section 36B between flanges 43 and 45.

Depending on the length dimension of the channel member, represented by the letter L in FIG. 2, rod 42 is provided with at least one flange or a plurality of flanges, for example, two or three, for engagement with a corresponding number of slotted openings in channel member 36 to divide the channel member into corresponding sections. Each section will be disposed between their respective flanges in the same manner described for sections 36A and 36B. The increased number of flanges not only strengthens the retention of rod 42 in channel 40, but also provides added securement of cushion 12 to its associated member, i.e., reaction housing 16 or cushion retainer member 14. Moreover, exposure to rupture or tearing of the cushion during the assembly process is significantly reduced because the flanges, and not the cushion, are used for assembling the cushion to the reaction housing.

Figure 4:
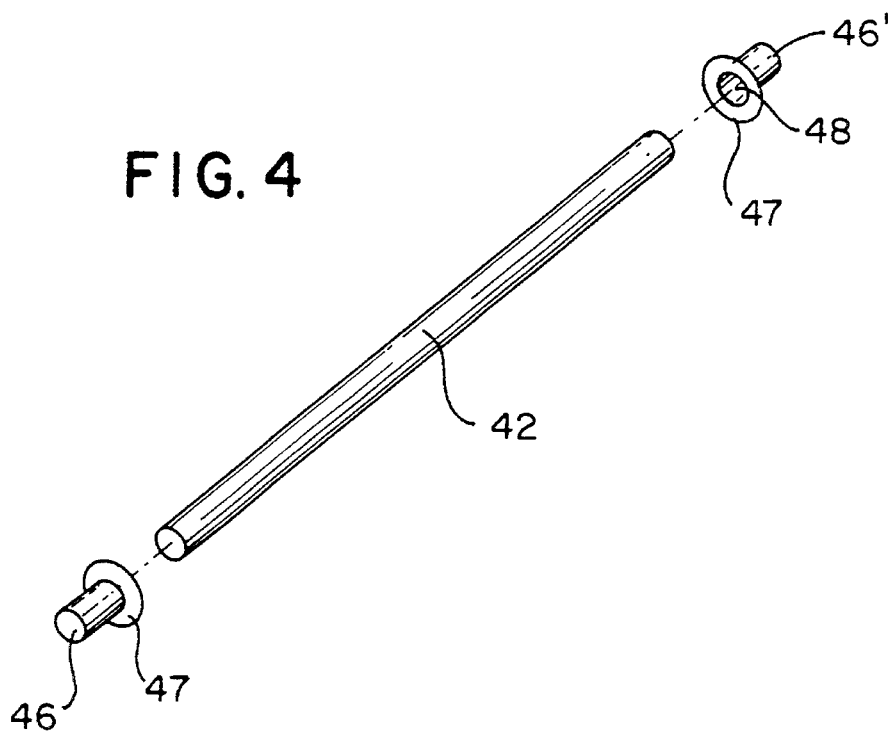
FIG. 4 is an alternative embodiment for retaining the elongate strip within the channel member of the inflatable cushion according to the invention.

In an alternative embodiment, particularly when the length L of channel member 36 is relatively short, the flanges may be disposed about rod 42 in the form of flanged caps 46 and 46' mounted to the ends of the rod without a central or intervening number of flanges disposed about the rod (see FIG. 4). Caps 46 and 46' have a flange 47 and 47' affixed thereto, respectively. Once rod 42 is inserted into channel 40 and the flanged caps are mounted to each end of the rod, the channel member 36 will be contained between flanges 47 and 47'. To insure the retention of channel member between the flanged caps 46 and 46', the cross-sectional area of flanges 47 and 47' are slightly larger than the channel 40 of channel member 36. The retention of flanged cap 46 on the end of rod 42 is insured by having the opening 48 in each of the caps form an interference fit with the end of rod 42. As an alternative, the caps may be fixed to the rod by any suitable means such as by adhesive bonding. The flanged caps may be of any construction or material that will provide securement and compatibility with rod 42, such as a mold injectable thermoplastic material.

In yet another embodiment of the invention, which is shown in FIG. 3, flanged caps 46 and 46' may be substituted for the end flanges 44 and 45, respectively, of FIG. 2 to accomplish the same task, i.e., maintaining the disposition of channel member sections 36A and 36B between flanges 47 and 43, and 43 and 47', respectively.

It will be appreciated that the physical size of the flanges (43, 44, 45, 47 and 47') is slightly larger than the cross-sectional area of channel 40. This permits channel member 36 to be disposed and retained between the flanges located about the ends of rod 42. It also permits central flange 43 (as well as the end flanges) to be slidably received in channel 40, preferably with a slight interference fit, and prevents the flange from becoming "unbuttoned" from slotted opening 38 with which it is engaged. In this manner, rod 42 is retained in channel member 36. In a preferred mode, the flanges disposed about rod 42 are of a substantially deformable consistency, i.e., the flanges are characterized in that they undergo a change in shape when subjected to an external force, for example, a compressive force used in a crimping operation. Alternatively, the flanges can be of a resilient consistency and sized for slidable insertion into their associated members, preferably with a slight interference fit. In this way, the resilient nature of the flange will impart the desired retention of the channel member within the targeted receptacle. The determining factor for imparting a desired characteristic to the flange will depend to a large extent on the nature of the receptacle into which the flanges are inserted, and the means by which the flanges are retained therein, which is described in greater detail below.

In accordance with another embodiment of the invention, the channel member 36 of inflatable cushion 12, plastic rod 42, and the various flanges disposed about rod 42, when combined and assembled together, form a flanged cushion insert which is identified by numeral 7 in FIG. 2 and numeral 8 in FIG. 3. The flanged cushion insert, including the entire cushion 12, is an assembly that can be easily handled and transported without the displacement or loss of rod 42. The assembly provides for the fastenerless attachment of the cushion to reaction housing 16 by the added use of flanges, effectively eliminating the need for direct contact with the cushion during the assembly process for implementing its coupling to the reaction housing.

As already noted in the Summary Of The Invention, the flanged cushion insert may be incorporated into an inflatable restraint system by either joining the insert with a cushion retainer member, described below, to form a cushion retainer insert for coupling cushion 12 with reaction housing 16 (illustrated in FIGS. 1 and 2 herein); or joining the insert directly with the reaction housing itself (illustrated in FIGS. 3 and 7).

Figure 7:
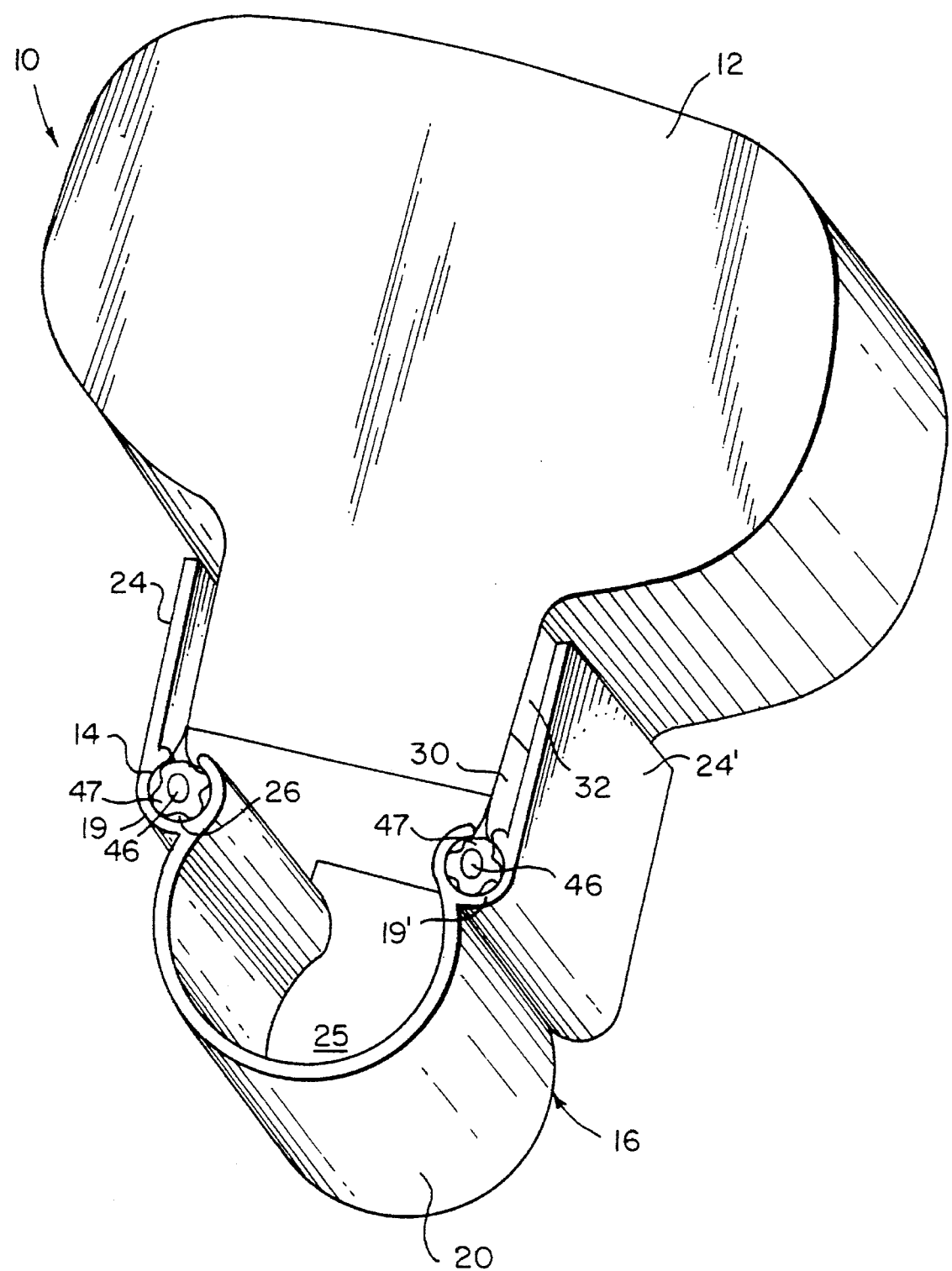
FIG. 7 is perspective view on a larger scale of a fully assembled system illustrating the coupling of a fully deployed inflatable cushion to a reaction housing according to the invention herein.

Referring specifically to FIGS. 1 and 7, reaction housing 16 has a generally cylindrical construction for defining a housing section 20 that encloses a cavity 25 to secure a compatibly configured inflator (not shown) therein. A rigid attachment sleeve, represented by 19 and 19' and resembling the shape of a narrow hollow cylinder for defining a cylindrically shaped opening 26, is integrally formed on each side of reaction housing 16. Each attachment sleeve 19, 19' is provided with an elongate slot 21 communicating with opening 26 and facing in the general direction of opening 72 of cushion 12. Side walls 24 and 24' are provided on each side of the reaction housing appurtenant to attachment sleeves 19, 19' respectively, for supporting and containing throat section 32 of cushion 12. It is understood that attachment sleeves 19, 19' can be separately made and joined to reaction housing 16 by any conventional means such as, for example, by welding.

The coupling of the flanged cushion insert 8 with reaction housing 16 is illustrated in FIG. 3. Flanges 47, 43 and 47' of insert 8, are of a resilient consistency and sized slightly larger than the cross-section of cylindrically shaped opening 26 of attachment sleeve 19 to provide for an interference fit. The flanges are guided in the direction of the arrows shown in FIG. 3 and axially inserted into opening 26 such that channel member sections 36A and 36B, as well as gas inlet opening 30, extend through elongate slot 21 in substantially perpendicular relationship thereto. Slot 21 has a thickness T that is less than the diameter of rod 42. During the insertion process, contact with the material of channel member sections 36A and 36B by the attachment sleeve 19 is substantially reduced since flanges 47, 43 and 47' are used as the coupling vehicle. Positioning and retention of the flanged insert in opening 26 of attachment sleeve 19 is achieved by the resilient nature of the respective flanges. An assembled system for coupling cushion 12 to reaction housing 16 utilizing two flanged cushion inserts and two corresponding attachment sleeves 19, 19' is illustrated in FIG. 7.

The use of a cushion retainer member to act as an interface between a flanged cushion insert, identified by numeral 7 in FIG. 2, and reaction housing 16 is illustrated in FIG. 1. Cushion retainer member 14 includes a first channel portion 50 and a second channel portion 51, both in the form of a slotted cylindrical sleeve, joined by spacer members 84 such that a generally rectangular opening is formed which is substantially identical to opening 72 of cushion 12 to permit the flow of gas therethrough when the inflator is activated. The cylindrical configuration of each channel portion 50 and 51 defines a channel passage 52. The channel portions are provided with an elongate slot 62 communicating with passage 52 and extending over the length thereof, slot 62 being further defined by extended side walls 53 and 54 appurtenant to each of the cylindrically configured channel portions.

The cushion retainer member 14 is typically of a ductile sheet metal construction, preferably steel or aluminum, although any material and construction can be used so as to withstand the forces encountered under operating conditions, viz., when the inflator (not shown) is activated and cushion 12 deployed.

Figure 5:
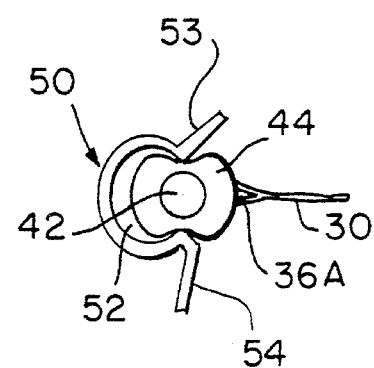
FIG. 5 is a plan view of the flanged cushion insert illustrated in FIG. 2 during its introduction into the channel portion of the cushion retainer member shown in FIG. 1.

The coupling of the flanged cushion insert 7 with cushion retainer member 14 is illustrated in FIGS. 1, 2, 5 and 6, the details of which are exemplified by FIG. 2 which shows insert 7 being coupled with channel portion 50 of cushion retainer member 14. Flanges 43, 44 and 45 of insert 7, which are of a deformable consistency, are guided in the direction of the arrows and "front loaded" into channel portion 50 by forcing the respective flanges in a perpendicular direction into elongate slot 62. Flanges 43, 44 and 45 are sized slightly larger than channel passage 52 to provide for a snap fit between sidewalls 53 and 54. The larger flange sizing also aids in the alignment of insert 7 during its placement into channel passage 52. FIG. 5 illustrates the general shape of the flanges (flange 44 is specifically illustrated) as they are snapped into channel passage 52.

Figure 6:
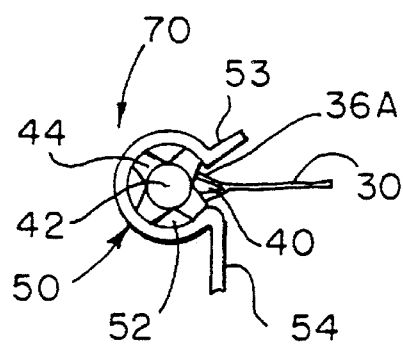
FIG. 6 is a plan view of the flanged cushion insert illustrated in FIG. 2 secured within the channel portion of the cushion retainer member shown in FIG. 1.

Once fully inserted into channel passage 52, channel member sections 36A and 36B, as well as gas inlet opening 30, will extend through elongate slot 62 in substantially perpendicular relationship thereto. After the insertion is complete, channel portion 50 is compressed about deformable flanges 43, 44 and 45 as shown in FIG. 6, with the result that the thickness T' of elongate slot 62 is reduced in thickness which is less than the diameter of rod 42. If needed, the compression or crimping of channel portion 50 about flanged cushion insert 7 can be facilitated by the provision of bend lines (not shown) along the channel portion's internal length. As in the assembly process of flanged cushion insert 8 with attachment sleeve 19 described above, contact with the material of channel members 36A and 36B by channel portion 50 and cushion retainer member 14 is substantially reduced since flanges 43, 44 and 45 are used for positioning and assembling insert 7 within channel portion 50.

When a corresponding number of flanged cushion inserts are properly coupled with channel portions 50 and 51, i.e., two, in the manner described above, the joinder of each cushion insert with its channel portion counterpart forms a cushion retainer insert 70 (see FIG. 6) that is sized and configured to be slidably received into the corresponding attachment sleeves 19 and 19' of reaction housing 16. As shown in FIG. 1, channel portions 50 and 51 are slidably inserted into sleeves 19 and 19' respectively, for coupling cushion 12 with reaction housing 16.

The coupling and securement of the flanged cushion inserts in cushion retainer member 14 to form respective cushion retainer inserts for incorporation into attachment sleeves 19, 19' insures a secure coupling of cushion 12 to the reaction housing. Furthermore, because of the excessive amount of internal force tending to expand the reaction housing during the brief period of time between inflator activation and cushion deployment, the cushion retainer member serves as a structural brace or cross-tie for holding the walls of the reaction housing together. Deformation of the reaction housing is therefore minimized if not eliminated. The inclusion of a retainer member also reduces the likelihood of damage to the cushion by undesirable contact with the inflator.

It is also to be noted that, if desired, the entire gas inlet opening 30 of cushion 12 can be fitted with a plurality of channel members and corresponding flanged cushion inserts. Cushion retainer member 14, as well as reaction housing 16, can then be configured in a way that will take into account the corresponding number of channel portions extended about opening 72.

By uniting the various components of the cushion assembly in the form of a flanged cushion insert in accordance with the invention herein, either with or without a cushion retainer member, an inexpensive cushion assembly is provided that facilitates and enhances the production of inflatable restraint systems. The flanged cushion insert unites its components in an easy-to-handle fashion. Less time and less individuals are required for coupling the cushion to the reaction housing on an assembly line thereby contributing to the economical fabrication and production of the end product. Moreover, the use of flanges for coupling the inflatable cushion into respective channel or sleeve receptacles guarantees a positive positioning of the cushion during the assembly process. Contact of the retainer or sleeve with the material of the cushion channel member during the assembly process is substantially reduced since the flange is used for guiding and assembling the cushion into the reaction housing or cushion retainer plate.

Other dimensions, shapes and forms can be utilized for the cushion assemblies and systems described above that will be apparent to those skilled in the art based on the disclosures provided herein.

Since other modifications and changes may be varied to fit particular purposes and specific environments, as will be apparent to those skilled in the art, the invention is not considered to be limited to the specific embodiments chosen for the purposes of disclosure herein, and covers all changes and modifications which do not constitute departures from its true spirit and scope.

What is claimed is:

1. An inflatable cushion assembly for coupling an inflatable cushion within an inflatable restraint system comprising:

a) an inflatable cushion including a gas inlet opening and at least one channel member disposed about the gas inlet opening;

b) at least one elongate strip disposed within the channel member; and c) means for retaining the strip within the channel member including at least one flange fixedly disposed about the strip and communicating with the channel member.

2. The assembly defined by claim 1 wherein the means for retaining the strip within the channel member includes at least one of the flanges fixedly disposed about the strip and engaged with a corresponding opening provided in the channel member such that the flange is substantially exposed exteriorly thereof, the flange being configured to be slidably received within the channel member.

3. The assembly defined by claim 2 wherein a plurality of the flanges are fixedly disposed about said elongate strip and engaged with a corresponding number of the openings provided in the channel member such that the flanges are substantially exposed exteriorly of said channel member to retain the strip therein.

4. The assembly defined by claim 2 wherein the means for retaining the strip within the channel member additionally includes one of the flanges disposed about each end of the elongate strip such that the channel member is disposed therebetween.

5. The assembly defined by claim 2 wherein the means for retaining the strip within the channel member additionally includes an end cap mounted to each end of the elongate strip, each said cap including one of the flanges mounted thereto such that the channel member is disposed therebetween.

6. The assembly defined by claim 1 wherein the means for retaining the strip within the channel member includes one of the flanges disposed about each end of the strip such that the channel member is proximate to said flanges and retained therebetween.

7. The assembly defined by claim 1 wherein the means for retaining the strip within the channel member includes at least two end caps each having the flange mounted thereto, each said cap being mounted to an associated end of the elongate strip such that the channel member is proximate to said flanges and retained therebetween.

8. The assembly defined by claim 1 wherein the flange and strip are monolithic.

9. The assembly defined by claim 1 wherein the flange is of a deformable consistency.

10. The assembly defined by claim 1 wherein the flange is of a resilient consistency.

11. The assembly defined by claim 1 wherein the channel member is in the form of a hem constructed from the material of the gas inlet opening of the inflatable cushion.

12. An inflatable cushion assembly for coupling an inflatable cushion within an inflatable restraint system comprising;

a) an inflatable cushion including a gas inlet opening and at least one channel member disposed about the gas inlet opening;

b) at least one elongate strip disposed in the channel member;

c) means for retaining the strip within the channel member including at least one flange fixedly disposed about the strip and communicating with the channel member, wherein the channel member, elongate strip and means for retaining the strip within the channel member define a flanged cushion insert; and d) a cushion retainer member including at least one channel portion for receiving and securing the flanged cushion insert therein to form a cushion retainer insert for coupling the flanged cushion insert within the inflatable restraint system.

13. The assembly defined by claim 12 wherein the flange is engaged with a corresponding opening provided in the channel member such that the flange is substantially exposed exteriorly thereof and is configured to be slidably received in the channel member.

14. The assembly defined by claim 13 wherein a plurality of the flanges are fixedly disposed about said elongate strip and engaged with a corresponding number of the openings provided in the channel member such that the flanges are substantially exposed exteriorly of the channel member to retain the strip therein.

15. The assembly defined by claim 13 wherein the means for retaining the strip within the channel member additionally includes one of the flanges disposed about each end of the elongate strip such that the channel member is disposed therebetween.

16. The assembly defined by claim 13 wherein the means for retaining the strip within the channel member additionally includes a cap mounted to each end of the elongate strip, each said cap including one of the flanges mounted thereto such that the channel member is disposed therebetween.

17. The assembly defined by claim 12 wherein the means for retaining the strip within the channel member includes one of the flanges disposed about each end of the strip such that the channel member is proximate to said flanges and retained therebetween.

18. The assembly defined by claim 12 wherein the means for retaining the strip within the channel member includes a cap mounted to each end of the elongate strip, each said cap including the flange mounted thereto such that the channel member is proximate to said flanges and retained therebetween.

19. The assembly defined by claim 12 wherein the flange and strip are monolithic.

20. The assembly defined by claim 12 wherein the flange is constructed of a deformable consistency.

21. The assembly defined by claim 12 wherein the channel member is in the form of a hem constructed from the material of the gas inlet opening of the inflatable cushion.

22. The assembly defined by claim 12 wherein the cushion retainer member includes a plurality of the channel portions for receiving and securing a corresponding number of the flanged inserts therein.

23. The assembly defined by claim 22 wherein the cushion retainer member includes first and second ones of the channel portions joined together in spaced apart relationship by at least one spacer member.

24. The assembly defined by claim 23 wherein the first and second channel portions are substantially parallel to each other and joined to each other adjacent the ends thereof by two spacer members.

25. A system for coupling an inflatable cushion to a reaction housing within an inflatable restraint system comprising:

a) an inflatable cushion including a gas inlet opening and at least one channel member disposed about the gas inlet opening;

b) at least one elongate strip disposed within the channel member;

c) means for retaining the strip within the channel member including at least one flange fixedly disposed about the strip and communicating with the channel member, wherein the channel member, elongate strip and means for retaining the strip within the channel member define a flanged cushion insert; and d) a reaction housing comprising an attachment sleeve configured to receive the flanged cushion insert therein thereby coupling the flanged insert and inflatable cushion to the reaction housing.

26. The system defined by claim 25 wherein the flange is engaged with a corresponding opening provided in the channel member such that the flange is substantially exposed exteriorly thereof and is configured to be slidably received in the channel member.

27. The system defined by claim 26 wherein a plurality of the flanges are fixedly disposed about said elongate strip and engaged with a corresponding number of the openings provided in the channel member such that the flanges are substantially exposed exteriorly of said channel member to retain the strip therein.

28. The system defined by claim 26 wherein the means for retaining the strip within the channel member additionally includes one of the flanges disposed about each end of the elongate strip such that the channel member is disposed therebetween.

29. The system defined by claim 26 wherein the means for retaining the strip within the channel member additionally includes an end cap mounted to each end of the elongate strip, each said cap including one of the flanges mounted thereto such that the channel member is disposed therebetween.

30. The system defined by claim 25 wherein the means for retaining the strip within the channel member includes one of the flanges disposed about each end of the elongate strip such that the channel member is proximate to said flanges and retained therebetween.

31. The system defined by claim 25 wherein the means for retaining the strip within the channel member includes a cap mounted to each end of the elongate strip, each said cap including the flange mounted thereto such that the channel member is proximate to said flanges and retained therebetween.

32. The system defined by claim 25 wherein the flange and strip are monolithic.

33. The system defined by claim 25 wherein the flange is of a resilient consistency.

34. The system defined by claim 25 wherein the channel member is in the form of a hem constructed from the material of the gas inlet opening of the inflatable cushion.

35. The system defined by claim 25 wherein the attachment sleeve is monolithic with the reaction housing.

36. The system defined by claim 25 wherein the reaction housing includes a plurality of the attachment sleeves for receiving a corresponding number of the flanged cushion inserts therein.

37. The system defined by claim 36 wherein the reaction housing includes two of the attachment sleeves for receiving a corresponding number of the flanged cushion inserts therein.

38. The system defined by claim 25 further including a cushion retainer member that includes at least one channel portion for receiving and securing the flanged cushion insert therein, the channel portion and secured flanged cushion insert defining a cushion retainer insert which is configured for insertion within the attachment sleeve of the reaction housing to couple and secure the inflatable cushion to the reaction housing.

39. The system defined by claim 38 wherein the cushion retainer member includes a plurality of the channel portions for receiving and securing a corresponding number of the flanged cushion inserts therein to form a corresponding number of cushion retainer inserts.

40. The system defined by claim 39 wherein the cushion retainer member includes first and second ones of the channel portions joined together in spaced relationship by at least one spacer member.

41. The system defined by claim 40 wherein the first and second channel portions are substantially parallel to each other and joined to each other adjacent the ends thereof by at least two spacer members.

42. The system defined by claim 38 wherein the flange is of a deformable consistency.

43. A method for fabricating an inflatable cushion assembly for incorporation into an inflatable restraint system comprising the steps of:
a) providing an inflatable cushion which includes a gas inlet opening and a channel member disposed about the gas inlet opening;
b) inserting at least one elongate strip within the channel member of said cushion; and
c) retaining the strip within the channel member by providing a retaining means including at least one flange fixedly disposed about the strip and communicating with the channel member;
wherein the channel member, elongate strip and retaining means define a flanged cushion insert.

44. The method according to claim 43 wherein the flange is engaged with a corresponding opening provided in the channel member such that the flange is substantially exposed exteriorly thereof and configured to be slidably received in the channel member.

45. The method according to claim 43 wherein the retaining means includes a plurality of the flanges fixedly disposed about the strip, each of the flanges being engaged with a corresponding number of openings provided in the channel member such that the flanges are substantially exposed exteriorly of said channel member to retain the strip therein.

46. The method according to claim 44 wherein the retaining means additionally includes one of the flanges disposed about each end of the elongate strip such that the channel member is disposed therebetween.

47. The method according to claim 44 wherein the retaining means additionally includes an end cap mounted to each end of the elongate strip, each said cap including one of the flanges mounted thereto such that the channel member is proximate to said flanges and retained therebetween.

48. The method according to claim 43 wherein the strip is retained within the channel member by mounting one of the flanges to each end of the strip such that the channel member is proximate to said flanges and retained therebetween.

49. The method according to claim 43 wherein the strip is retained within the channel member by providing a plurality of caps each having one of the flanges mounted thereto, and mounting one of the caps to each end of the strip such that the channel member is proximate to said flanges and retained therebetween.

50. The method according to claim 43 wherein the flange and strip are monolithic.

51. The method according to claim 43 wherein the channel member is in the form of a hem constructed from the material of the gas inlet opening of the inflatable cushion.

52. A method for coupling an inflatable cushion to a reaction housing in an inflatable restraint system comprising the step of incorporating the flanged cushion insert defined in claim 43 within an attachment sleeve fixedly engaged with the reaction housing, the attachment sleeve being configured to slidably receive the flange of the cushion insert therein thereby coupling the cushion insert and inflatable cushion to the reaction housing.

53. The method according to claim 52 wherein the flanged cushion insert is axially inserted into the attachment sleeve of the reaction housing.

54. The method according to claim 52 wherein the flange of the flanged cushion insert is of a resilient consistency.

55. A method for coupling an inflatable cushion to a reaction housing in an inflatable restraint system comprising the steps of:
   a) securing the flanged cushion insert defined in claim 43 within a channel portion of a cushion retainer member, the channel portion being configured to receive the flanged cushion insert therein to form a cushion retainer insert; and
   b) incorporating the cushion retainer insert into a corresponding attachment sleeve fixedly engaged with the reaction housing, the attachment sleeve being configured to slidably receive the cushion retainer insert therein for coupling the flanged cushion insert and inflatable cushion to the reaction housing.

56. The method according to claim 55 wherein the flange of the flanged cushion insert is of a deformable consistency.

57. The method according to claim 55 wherein securement of the flanged cushion insert within the channel portion of the cushion retainer member is obtained by compressing the channel portion about the flanged cushion insert.

* * * * *